US 6,521,305 B1

(12) United States Patent
Mitchell et al.

(10) Patent No.: US 6,521,305 B1
(45) Date of Patent: *Feb. 18, 2003

(54) CUSHIONING DEVICE WITH IMPROVED FLEXIBLE BARRIER MEMBRANE

(76) Inventors: Paul H. Mitchell, 2014 Kerhsboro Dr., Chesterfield, MO (US) 63005; James C. Sell, Jr., 24512 NE. Berlin Rd., Battleground, WA (US) 98604; Henry W. Bonk, 51 Seiter Hill Rd., Wallingford, CT (US) 06492

( * ) Notice: Subject to any disclaimer, the term of this patent is extended or adjusted under 35 U.S.C. 154(b) by 0 days.

This patent is subject to a terminal disclaimer.

(21) Appl. No.: 09/395,896

(22) Filed: Sep. 14, 1999

Related U.S. Application Data

(63) Continuation of application No. 08/299,287, filed on Aug. 31, 1994, now Pat. No. 5,952,065.

(51) Int. Cl.$^7$ ................ A43B 13/02; A43B 13/14; A43B 13/40
(52) U.S. Cl. ............... 428/35.4; 428/36.6; 428/36.7; 428/36.8; 428/339; 428/423.1; 428/424.2; 36/28; 36/30 R; 36/35 R; 36/44; 156/244.14; 156/244.24
(58) Field of Search .................. 428/35.7, 35.4, 428/36.6, 36.7, 36.8, 422.8, 423.1, 424.2, 76, 215, 220, 339; 156/244.11, 244.14, 244.24; 36/28, 29, 30 R, 35 R, 44

(56) References Cited

U.S. PATENT DOCUMENTS

| | | |
|---|---|---|
| 3,718,494 A | 2/1973 | Jacobson |
| 4,082,854 A | 4/1978 | Yamada et al. |
| 4,257,176 A | 3/1981 | Hartung et al. |
| 4,340,626 A | 7/1982 | Rudy |
| 4,344,987 A | 8/1982 | Ostertag et al. |
| 4,423,185 A | 12/1983 | Matsumoto et al. |
| 4,429,076 A | 1/1984 | Saito et al. |
| 4,501,790 A | 2/1985 | Aizawa et al. |

(List continued on next page.)

FOREIGN PATENT DOCUMENTS

| | | |
|---|---|---|
| EP | 624463 | 11/1994 |
| FR | 2636638 | * 3/1990 |
| JP | 52-069486 | 6/1977 |
| JP | 56(1981)-121292 | 7/1981 |
| JP | 58-22163 | 2/1983 |
| JP | 62-116145 | 5/1987 |
| JP | 59-196706 | 11/1987 |
| JP | 62-253428 | 11/1987 |
| WO | WO 8705563 | 9/1987 |

OTHER PUBLICATIONS

Bayer Polymers Division, Engineering Polymers Property Guide, Thermoplastics & Thermosets.
McGraw–Hill Dictionary of Scientific and Technical Terms, Sybil P. Parker, ed 5th ed. 1994.
Encyclopedia of Polymer Science and Engineering, Herman F. Mark et al. Eds, 2d Ed. 1985.
Bayer Sales Brochure, Engineering Polymers Properties Guide, (May 1995), three (3) p.1.
Hawley's Condensed Chemical Dictionary (rev. by Richard J. Lewis, Sr., 12th ed., 1993).

*Primary Examiner*—Rena Dye
(74) *Attorney, Agent, or Firm*—Harness, Dickey & Pierce, P.L.C.

(57) ABSTRACT

Products in the form of cushioning devices made from flexible membranes employing at least one layer including thermoplastic urethane and at least one layer of a copolymer of ethylene and vinyl alcohol are inflatable to a relatively high pressure. The cushioning devices maintain the internal inflatant pressure for extended periods of time by employing a phenomenon referred to in the industry as diffusion pumping. Ideally, the cushioning devices of the present invention can be permanently inflated with gases such as nitrogen or air.

26 Claims, 10 Drawing Sheets

U.S. PATENT DOCUMENTS

| | | | |
|---|---|---|---|
| 4,513,058 A | * | 4/1985 | Martin ..................... 428/336 |
| 4,536,425 A | | 8/1985 | Hekal |
| 4,551,518 A | | 11/1985 | Matsumoto et al. |
| 4,557,859 A | | 12/1985 | Maeda et al. |
| 4,610,099 A | | 9/1986 | Signori |
| 4,614,208 A | | 9/1986 | Skarelius |
| 4,639,471 A | | 1/1987 | Hirai et al. |
| 4,660,831 A | | 4/1987 | Kralik |
| 4,681,797 A | | 7/1987 | Van Iseghem |
| 4,692,361 A | | 9/1987 | Johnston et al. |
| 4,722,131 A | | 2/1988 | Huang |
| 4,731,289 A | | 3/1988 | Coleman |
| 4,786,685 A | | 11/1988 | Takida et al. |
| 4,864,738 A | | 9/1989 | Horovitz |
| 4,874,670 A | | 10/1989 | Boon et al. |
| 4,887,367 A | | 12/1989 | Mackness et al. |
| 4,890,822 A | | 1/1990 | Ezure et al. |
| 4,927,689 A | | 5/1990 | Markiewicz |
| 4,936,029 A | | 6/1990 | Rudy |
| 4,960,639 A | | 10/1990 | Oda et al. |
| 4,978,394 A | | 12/1990 | Ostertag et al. |
| 4,999,229 A | * | 3/1991 | Moritani et al. ............ 428/36.6 |
| 5,003,002 A | | 3/1991 | Ofstein |
| 5,030,404 A | | 7/1991 | Bonnebat et al. |
| 5,036,110 A | * | 7/1991 | Moureaux ..................... 428/95 |
| 5,036,113 A | | 7/1991 | Boon et al. |
| 5,036,603 A | | 8/1991 | Dischler |
| 5,042,176 A | | 8/1991 | Rudy |
| 5,042,781 A | | 8/1991 | Ezure et al. |
| 5,053,455 A | | 10/1991 | Kroggel et al. |
| 5,059,245 A | | 10/1991 | Phillips et al. |
| 5,090,010 A | | 2/1992 | Takahashi |
| 5,096,756 A | | 3/1992 | Walters |
| 5,096,759 A | * | 3/1992 | Walters ..................... 428/35.5 |
| 5,157,082 A | * | 10/1992 | Johnson ..................... 525/237 |
| 5,181,717 A | | 1/1993 | Donntag et al. |
| 5,198,042 A | | 3/1993 | Masumoto et al. |
| 5,215,124 A | * | 6/1993 | Hattori et al. ................ 138/30 |
| 5,246,761 A | | 9/1993 | Sasaki |
| 5,292,824 A | | 3/1994 | Nagai et al. |
| 5,294,112 A | | 3/1994 | Smith |
| 5,300,334 A | * | 4/1994 | Niederst et al. ............ 428/35.7 |
| 5,332,767 A | | 7/1994 | Reisser et al. |
| 5,346,950 A | | 9/1994 | Negi et al. |
| 5,393,832 A | * | 2/1995 | Moulies et al. ................ 525/57 |
| 5,409,041 A | | 4/1995 | Yoshida et al. |
| 5,416,988 A | | 5/1995 | Potter et al. |
| 5,429,852 A | | 7/1995 | Quinn |
| 5,436,295 A | | 7/1995 | Nishikawa et al. |
| 5,456,787 A | | 10/1995 | Myles |
| 5,458,935 A | * | 10/1995 | Alzner ..................... 428/35.7 |
| 5,462,980 A | | 10/1995 | Bastioli et al. |
| 5,489,455 A | | 2/1996 | Nugent, Jr. et al. |
| 5,498,662 A | | 3/1996 | Tanaka et al. |
| 5,532,284 A | | 7/1996 | Bartlett et al. |
| 5,540,770 A | | 7/1996 | Schmid et al. |
| 5,567,489 A | * | 10/1996 | Allen et al. ................ 428/34.1 |
| 5,578,372 A | | 11/1996 | Murakami |
| 5,591,798 A | | 1/1997 | Patel |
| 5,601,889 A | | 2/1997 | Chundury et al. |
| 5,609,962 A | | 3/1997 | Ouhadi |
| 5,612,101 A | | 3/1997 | Furuta et al. |
| 5,633,065 A | | 5/1997 | Matsukura et al. |
| 5,645,923 A | | 7/1997 | Matsuo et al. |
| 5,662,738 A | | 9/1997 | Schmid et al. |
| 5,693,424 A | | 12/1997 | Watanabe et al. |
| 5,700,560 A | | 12/1997 | Kotani et al. |
| 5,713,141 A | | 2/1998 | Mitchell et al. |
| 5,952,065 A | * | 9/1999 | Mitchell et al. ............ 428/35.4 |
| 6,013,340 A | | 1/2000 | Bonk et al. |

* cited by examiner

CUSHIONING DEVICE WITH IMPROVED FLEXIBLE BARRIER MEMBRANE

This is a continuation of U.S. patent application No. 08/299,287, filed Aug. 31, 1994, U.S. Pat. No. 5,952,065.

FIELD OF THE INVENTION

The present invention relates to cushioning devices for footwear and, more particularly, to a gas-filled cushioning device which includes an elastomeric barrier material for selectively controlling the diffusion of inert gases while allowing controlled diffusion of gases normally contained in the atmosphere, with the cushioning device being particularly employed in footwear products.

BACKGROUND OF THE INVENTION

Shoes, and particularly athletic shoes, can be described as including two major categories of components namely, a shoe upper and a sole. The general purpose of the shoe upper is to snugly and comfortably enclose the foot. Ideally, the shoe upper should be made from an attractive, highly durable, yet comfortable material or combination of materials. The sole, which also can be made from one or more durable materials, is primarily designed to provide traction, and to protect the wearer's feet and body during any use consistent with the design of the shoe. The considerable forces generated during uses such as athletic activities require that the sole of an athletic shoe provide enhanced protection and shock absorption for the feet, ankles and legs of the wearer. For example, impacts which occur during running activities can generate forces of up to two to three times body weight; certain other activities, e.g., playing basketball, have been known to generate forces of up to approximately 6–10 times an individual's body weight. Accordingly, many shoes and, more particularly, many athletic shoe soles are now provided with some type of resilient, shock-absorbent material or shock-absorbent components to cushion the user during strenuous athletic activity. Such resilient, shock-absorbent materials or components have now commonly come to be referred to in the shoe manufacturing industry as the mid-sole.

More specifically, it has been a focus of the industry to seek a mid-sole design which achieves an effective impact response in which both adequate shock absorption and resiliency are appropriately taken into account. Such resilient, shock-absorbent materials or components could also be applied to the insole portion of the shoe, which is generally defined as the portion of the shoe upper directly underlining the plantar surface of the foot.

A specific focus in the shoe manufacturing industry has been to seek mid-sole or insert structure designs which are adapted to contain fluids, in either the liquid or gaseous state, or both. Examples of gas-filled structures which are utilized within the soles of shoes are shown in U.S. Pat. No. 900,867 entitled "Cushion for Footwear" which issued Oct. 13, 1908, to Miller; U.S. Pat. No. 1,069,001 entitled "Cushioned Sole and Heel for Shoes" which issued Jul. 29, 1913, to Guy; U.S. Pat. No. 1,304,915 entitled "Pneumatic Insole" which issued May 27, 1919, to Spinney; U.S. Pat. No. 1,514,468 entitled "Arch Cushion" which issued Nov. 4, 1924, to Schopf; U.S. Pat. No. 2,080,469 entitled "Pneumatic Foot Support" which issued May 18, 1937, to Gilbert; U.S. Pat. No. 2,645,865 entitled "Cushioning Insole for Shoes" which issued Jul. 21, 1953, to Towne; U.S. Pat. No. 2,677,906 entitled "Cushioned Inner Sole for Shoes and Method of Making the Same" which issued May 11, 1954, to Reed; U.S. Pat. No. 4,183,156 entitled "Insole Construction for Articles of Footwear" which issued Jan. 15, 1980, to Rudy; U.S. Pat. No. 4,219,945 entitled "Footwear" which issued Sept. 2, 1980, also to Rudy; U.S. Pat. No. 4,722,131 entitled "Air Cushion Shoe Sole" which issued Feb. 2, 1988, to Huang; and U.S. Pat. No. 4,864,738 entitled "Sole Construction for Footwear" which issued Sep. 12, 1989, to Horovitz; all of which are incorporated herein by reference. As will be recognized by those skilled in the art, such gas filled structures (often referred to in the shoe manufacturing industry as "bladders") typically fall into two broad categories, namely (1) "permanently" inflated systems such as those disclosed in U.S. Pat. Nos. 4,183,156 and 4,219,945 and (2) pump and valve adjustable systems as exemplified by U.S. Pat. No. 4,722,131. By way of further example, athletic shoes of the type disclosed in U.S. Pat. No. 4,182,156 which include "permanently" inflated bladders have been successfully sold under the trade mark "Air Sole" and other trademarks by Nike, Inc. of Beaverton, Oregon. To date, millions of pairs of athletic shoes of this type have been sold in the United States and throughout the world.

The permanently inflated bladders are typically constructed under methods using a flexible thermoplastic material which is inflated with a large molecule, low solubility coefficient gas otherwise referred to in the industry as a "super gas," such as $SF_6$. By way of example, U.S. Pat. No. 4,340,626 entitled "Diffusion Pumping Apparatus Self-Inflating Device" which issued Jul. 20, 1982, to Rudy, which is expressly incorporated herein by reference, discloses a pair of elastomeric, selectively permeable sheets of film which are formed into a bladder and thereafter inflated with a gas or mixture of gases to a prescribed pressure which preferably is above atmospheric pressure. Ideally, the gas or gases utilized have a relatively low diffusion rate through the selectively permeable bladder to the exterior environment while gases such as nitrogen, oxygen and argon (which are contained in the atmosphere and have a relatively high diffusion rate) are able to penetrate the bladder. This produces an increase in the total pressure within the bladder by the additive nature of the partial pressures of the nitrogen, oxygen and argon which diffuse into the bladder from the atmosphere and the partial pressures of the gas or gases contained initially injected into the bladder upon inflation. This concept of an almost total "one-way" addition of gases to enhance the total pressure of the bladder is now known in the art as "diffusion pumping."

In a diffusion pumping system, there is a period of time involved before a steady state of internal pressure is achieved. The period of time is related to the bladder material used and the choice of gas or gases contained in the bladder. For example, oxygen tends to diffuse into the bladder rather quickly with the effect being an increase in the internal pressure of approximately 2.5 psi. In contrast, over the course of a number of weeks nitrogen gas will gradually diffuse into the bladder resulting in an increase of pressure to approximately 12.0 psi. This gradual increase in bladder pressure typically causes an increase in tension in the skin, resulting in a volume increase due to stretching. This effect is commonly referred to in the industry as "tensile relaxation" or "creep." Thus, the initial selection of materials employed in the bladder and the choice of the captive gas or gas mixture utilized to initially inflate the bladder is critical to achieving a bladder which is essentially permanently inflated at a desired internal pressure and which therefore maintains a desired internal pressure over an extended period of time.

Prior to and shortly after the introduction of the Air Sole™ athletic shoes, many of the mid-sole bladders employed in the industry consisted of a single layer gas barrier type film made from polyvinylidene chloride based materials such as Saran® (which is a registered trademark of the Dow Chemical Co.). These materials which, by their nature are rigid plastics, are less than ideal from the standpoint of flex fatigue, heat sealability, elasticity, and degradation. Attempts to address these limitations by creating bladder films made by techniques such as laminations and coatings (which involve one or more barrier materials in combination with a flexible bladder material such as various thermoplastics) then present a wide variety of problems typical of such combinations. Such difficulties with composite constructions typically include layer separation; peeling; gas diffusion or capillary action at weld interfaces; low elongation which leads to wrinkling of the inflated product; cloudy appearing finished bladders; reduced puncture resistance and tear strength; resistance to formation via blow-molding and/or heat-sealing and/or R-F welding; high cost processing; and difficulty with foam encapsulation and adhesive bonding; among others.

The art has attempted to address these problems (created by trying to laminate two or more dissimilar materials to balance the advantages and disadvantages of any single material) by the use of tie-layers or adhesives between the layers in preparing laminates. The use of such tie layers or adhesives help solve some of the difficulties noted above but generally prevent regrinding and recycling of any waste materials created during product formation back into an usable product, and thus, also contribute to high cost of manufacturing and relative waste. These and other short comings of the prior art are described in more extensive detail in U.S. Pat. Nos. 4,340,626; 4,936,029 and 5,042,176 which are hereby expressly incorporated by reference.

With the extensive commercial success of the products such as the Air Sole™ shoes, consumers have been able to enjoy a product with a long service life, superior shock absorbency and resiliency, reasonable cost, and inflation pressure stability, without having to resort to pumps and valves. Thus, in light of the significant commercial acceptance and success that has been achieved through the use of long life inflated gas filled bladders, it is highly desirable to develop advancements to solve the few remaining disadvantages associated with such products. The goal then is to provide flexible, "permanently" inflated, gas-filled shoe cushioning components which meet, and hopefully exceed, performance achieved by such products as the Air Sole™ athletic shoes offered by Nike, Inc.

One key area of potential advancements stems from a recognition that it would be desirable to employ "capture" or "captive" gases other than the large molecule, low solubility coefficient "super gases" as described in the '156, '945 and '738 patents, replacing them with less costly and possibly more environmentally friendly gases. For example, U.S. Pat. Nos. 4,936,029 and 5,042,176 specifically discuss the methods of producing a flexible bladder film that essentially maintains permanent inflation through the use of nitrogen as the captive gas. As further described in U.S. Pat. No. 4,906,502, also expressly incorporated herein by reference, many of the perceived problems discussed in the '029 and '176 patents are solved by the incorporation of mechanical barriers of crystalline material into the flexible film such as fabrics, filaments, scrims and meshes. Again, significant commercial success for footwear products using the technology described in '502 patent (marketed under the trademark Tensile Air™ by Nike, Inc.) has been achieved. The bladders utilized therein are typically comprised of a thermoplastic urethane laminated to a core fabric three-dimensional, double bar Raschel knit nylon fabric, having $SF_6$ as the captive gas contained therein. As discussed in the '502 patent, such bladder constructions have reduced permeability to $SF_6$, nitrogen and other captive gases.

Exemplary of an accepted method of measuring the relative permeance, permeability and diffusion of different film materials is set forth in the procedure designated as ASTM 1434V. According to ASTM 1434V, permeance, permeability and diffusion are measured by the following formulas:

$$\text{Permeance}$$

$$\frac{(\text{quantity of gas})}{(\text{area}) \times (\text{time}) \times (\text{press. diff.})} =$$

$$\frac{\text{Permeance}}{(GTR)/(\text{press. diff.})} = \frac{\text{cc.}}{(\text{sq. m})(24 \text{ hr})(\text{Pa})}$$

$$\text{Permeability}$$

$$\frac{(\text{quantity of gas}) \times (\text{film thick})}{(\text{area}) \times (\text{time}) \times (\text{press. diff.})} =$$

$$\frac{\text{Permeability}}{(GTR) \times (\text{film thick})/(\text{press. diff.})} = \frac{\text{cc. (mil)}}{(\text{sq. m})(24 \text{ hr})(\text{Pa})}$$

$$\text{Diffusion}$$

$$\frac{(\text{quantity of gas})}{(\text{area}) \times (\text{time})} = \frac{\text{Gas Transmission Rate}}{(GTR)} = \frac{\text{cc.}}{(\text{sq. m})(24 \text{ hr})}$$

By utilizing the above listed formulae, the gas transmission rate in combination with a constant pressure differential and the film's thickness, can be utilized to define the movement of gas under specific conditions. In this regard, the preferred gas transmission rate (GTR) for a bladder in an athletic shoe component which seeks to meet the rigorous demands of fatigue resistance imposed by heavy and repeated impacts has a gas transmission rate (GTR) value of less than about 10, more preferably less than about 7.5, still more preferably less than about 5., and still more preferably, a (GTR) value of 2.0 or lower, preferably as measured by the above procedure.

In addition to the aforementioned, the '029 and '176 patents also discuss problems encountered with previous attempts to use co-laminated combinations of plastic materials at least one of which is selected to operate as a barrier to oxygen. In this regard, the principal concern was the lack of fatigue resistance of the barrier layer. As described in the '176 patent, a satisfactory co-lamination of polyvinylidene chloride (such as Saran®) and a urethane elastomer would require an intermediate bonding agent. Under such a construction, relatively complicated and expensive processing controls would be required, such as strict time-temperature relationships and the use of heated platens and pressures, coupled with a cold press to freeze the materials together under pressure. Additionally, using adhesive tie layers or incorporating crystalline components into the flexible film at high enough levels to accomplish a gas transmission rate of 10 or less, dramatically reduces the flexibility of the film.

It is therefore, a principal object of the present invention to provide an inflatable cushioning device that is essentially permanently inflated with nitrogen or another environmentally desirable gas or combination of gases which meet the goals of flexibility, durability and low cost.

It is another object of the present invention to provide a cushioning device having a permeable barrier material with a gas transmission rate value of 10.0 or less.

It is still another object of the present invention to provide a cushioning device which substantially resists peeling between layers, is relatively transparent and economical to manufacture.

It is yet another object of the present invention to provide a cushioning device where the barrier layer substantially resists delamination and does not require a tie layer between the barrier layer and the flexible layers.

It is a further object of the present invention to provide a cushioning device which is formable utilizing the various techniques including, but not limited to, blow-molding, tubing, sheet extrusion, vacuum-forming, heat-sealing and RF welding.

It is an additional object of the present invention to provide a gas cushioning device which prevents gas from escaping along interfaces between the materials via capillary action.

It is yet another object of the present invention to provide a cushioning device which allows for normal footwear processing such as encapsulating the cushioning device in formable material.

The above list is not intended to be exhaustive of the objects or advantages of the present invention.

SUMMARY OF THE INVENTION

To achieve the foregoing and other objectives, the present invention provides a cushioning device which features one or more novel gas-filled membranes with both the desired physical properties of a thermoplastic elastomeric film and with improved barrier properties for retaining nitrogen gas and other captive gases. The gas-filled membranes are formulated so as to selectively control the rate of outward diffusion of certain captive gases (e.g., nitrogen and super gases) through the membranes as well as enable diffusion pumping of externally mobile gases (e.g., argon, oxygen, carbon dioxide and the other gases which are present in ambient air), into the gas-filled membranes.

The gas-filled membranes of the present invention are preferably constructed of at least two flexible materials which together act as a barrier, and which are preferably elastomeric and polar in nature and capable of forming products in a variety of geometries. Ideally, the flexible barrier materials utilized in accordance with the teachings of the present invention should contain the captive gas within an interior compartment of the gas-filled membrane for a relatively long period of time. In a highly preferred embodiment, for example, the gas-filled membrane should not lose more than about 20% of the initial inflated gas pressure over a period of two years. In other words, products inflated initially to a steady state pressure of between 20.0 to 22.0 psi should retain pressure in the range of about 16.0 to 18.0 psi after a period of about two years.

Additionally, the barrier materials utilized should be flexible, relatively soft and compliant and should be highly resistant to fatigue and be capable of being welded to form effective seals typically achieved by RF welding or heat sealing. The barrier material should also have the ability to withstand high cycle loads without failure, especially when the barrier material utilized has a thickness of between about 5 mils to about 50 mils. Another important characteristic of the membranes of the present invention is that they should be processable into various shapes by techniques used in high volume production. Among these desirable techniques known in the art are blow molding, injection molding, vacuum molding, rotary molding, transfer molding and pressure forming. The membranes of the present invention should be preferably formable by extrusion techniques, such as tubing or sheet extrusion, including extrusion blow molding particularly at sufficiently high temperatures to attain the desired "adhesive" or "chemical" bonding as will be described in greater detail below without the use of a separate adhesive or tie-layer. These aforementioned processes should give rise to products whose cross-sectional dimensions can be varied.

As mentioned above, a significant feature of the membranes of the present invention is the controlled diffusion of mobile gases through the barrier layer and retention of captive gases therein. By the present invention, not only are the super gases usable as captive gases, but nitrogen gas may also be used as a captive gas due to the improved performance of the barrier. The primary mobile gas is oxygen, which diffuses relatively quickly through the barrier, and the other mobile gases may be any of the gases normally present in air except nitrogen. The practical effect of providing a barrier material for which nitrogen gas is suitable as a captive gas is significant.

For example, the membrane may be initially inflated with nitrogen gas or a mixture of nitrogen gas and one or more super gases or with air. If filled with nitrogen or a mixture of nitrogen and one or more super gases, an increment of pressure increase results from the relatively rapid diffusion of oxygen gas into the membrane, since the captive gas is essentially retained within the membrane. This effectively amounts to an increase in pressure of not greater than about 2.5 psi over the initial inflation pressure and results in a relatively modest volume growth of the membrane of between 1 to 5%, depending on the initial pressure. However, if air is used as the inflatant gas, oxygen tends to diffuse out of the membrane while the nitrogen is retained as the captive gas. In this instance, the diffusion of oxygen out of the membrane and the retention of the captive gas results in an incremental decrease of the steady state pressure over the initial inflation pressure.

This invention has many other advantages which will be more apparent to the skilled artisan from consideration of the various forms and embodiments of the present invention. Such embodiments are shown in the accompanying drawings and form a part of the present specification. The various embodiments will now be described in greater detail for the purpose of illustrating the general principles of the invention without considering the following detailed description in the limiting sense.

DETAILED DESCRIPTION OF THE PREFERRED EMBODIMENTS

Figure 1:
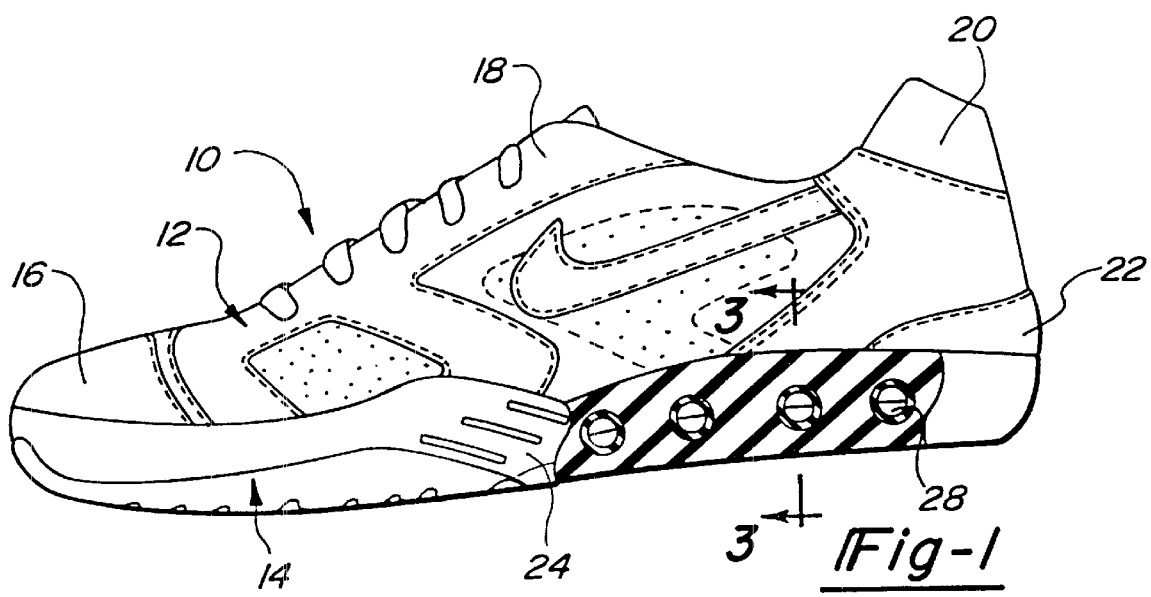
FIG. 1 is a side elevational view of an athletic shoe in accordance with the present invention with a portion of the mid-sole cut-a-way to expose a cross-sectional view.
Figure 2:
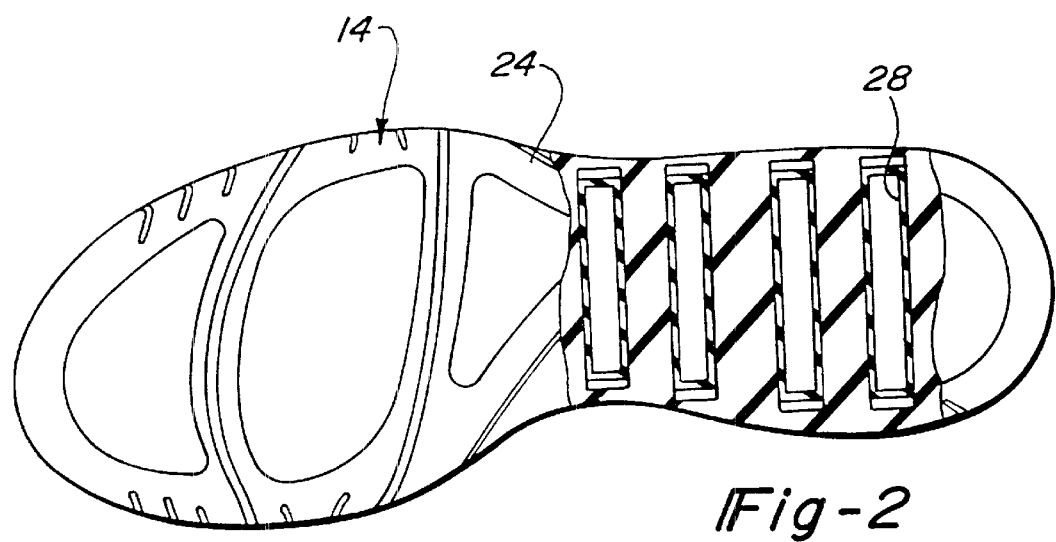
FIG. 2 is a bottom elevational view of the athletic shoe of FIG. 1 with a portion cut-a-way to expose another cross-sectional view.
Figure 3:
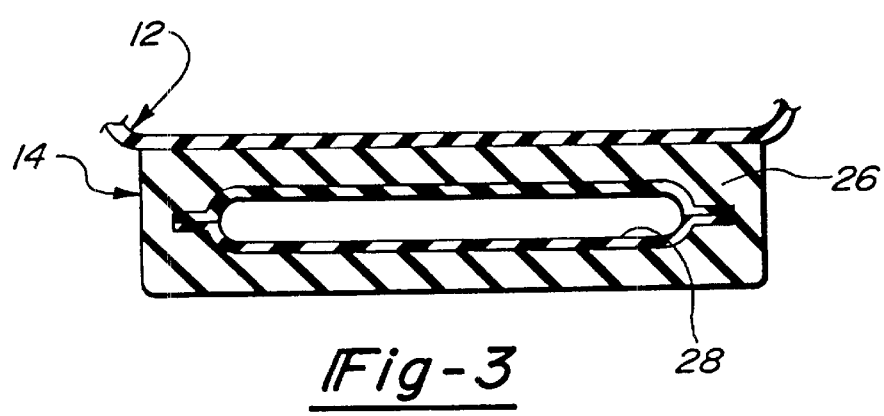
FIG. 3 is a section view taken along line 3—3 of FIG. 1.
Figure 4:
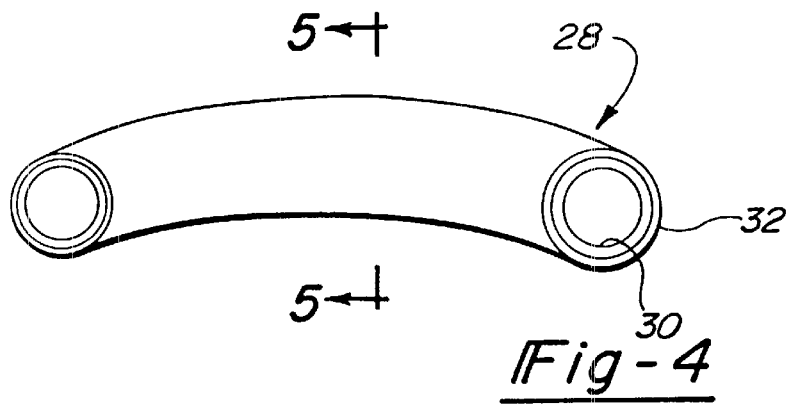
FIG. 4 is a fragmentary side perspective view of one embodiment of a tubular-shaped, two-layer cushioning device in accordance with the present invention.
Figure 5:
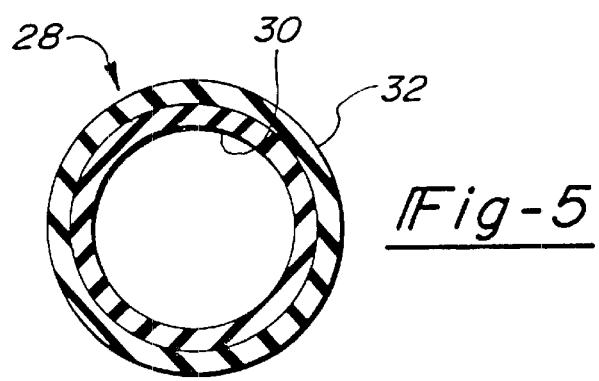
FIG. 5 is a sectional view taken along line 4—4 of FIG. 4.

Referring to FIGS. 1–5, there is shown an athletic shoe 10, including a sole structure and a cushioning device otherwise referred to herein as a membrane in accordance with the teachings of the present invention. The shoe 10 includes a shoe upper 12 to which the sole 14 is attached. The shoe upper 12 can be formed from a variety of conventional materials including, but not limited to, leathers, vinyls, nylons and other generally woven fibrous materials. Typically, the shoe upper 12 includes reinforcements located around the toe 16, the lacing eyelets 18, the top of the shoe 20 and along the heel area 22. As with most athletic shoes, the sole 14 extends generally the entire length of the shoe 10 from the toe region 20 through the arch region 24 and back to the heel portion 22.

Figure 8:
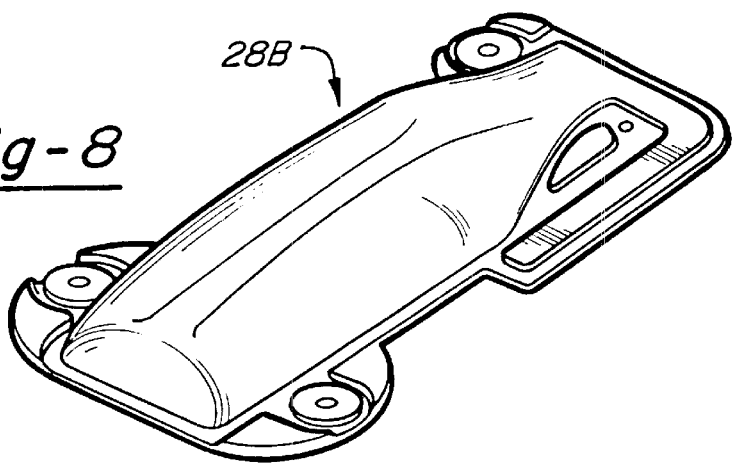
FIG. 8 is a perspective view of an alternative membrane embodiment according to the present invention.
Figure 9:
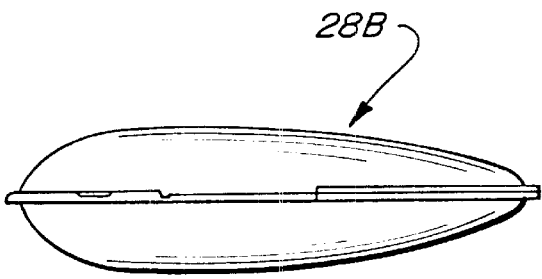
FIG. 9 is a side view of the membrane illustrated in FIG. 8.
Figure 10:
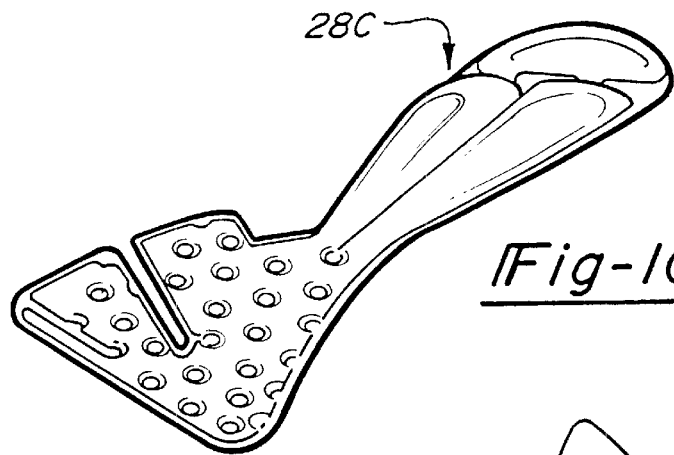
FIG. 10 is a perspective view of an alternative membrane embodiment according to the present invention.
Figure 11:
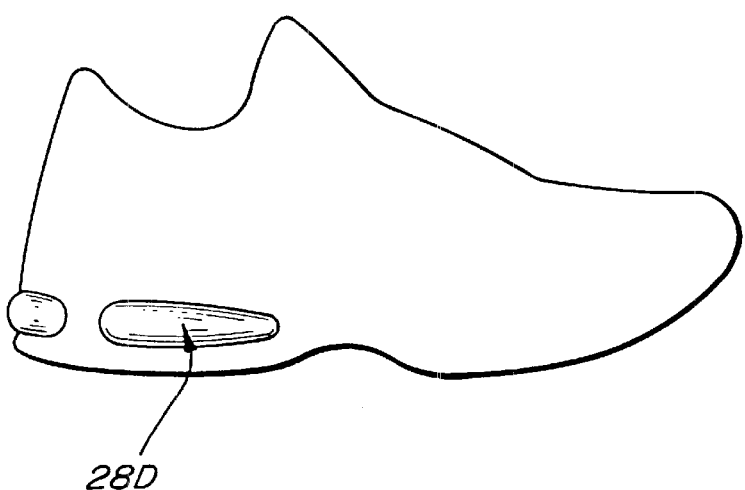
FIG. 11 is a side elevational view of an athletic shoe having an alternative membrane embodiment according to the present invention.
Figure 12:
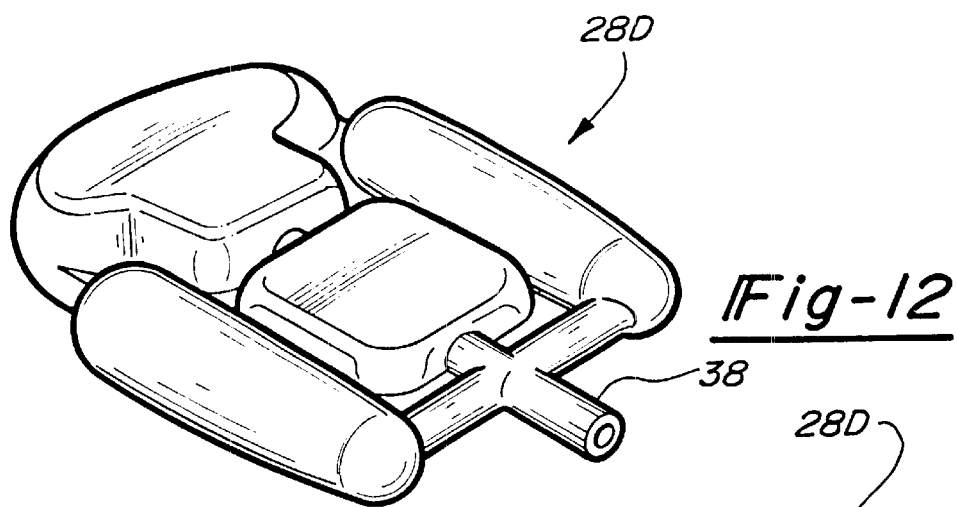
FIG. 12 is a perspective view of the membrane illustrated in FIG. 11.
Figure 13:
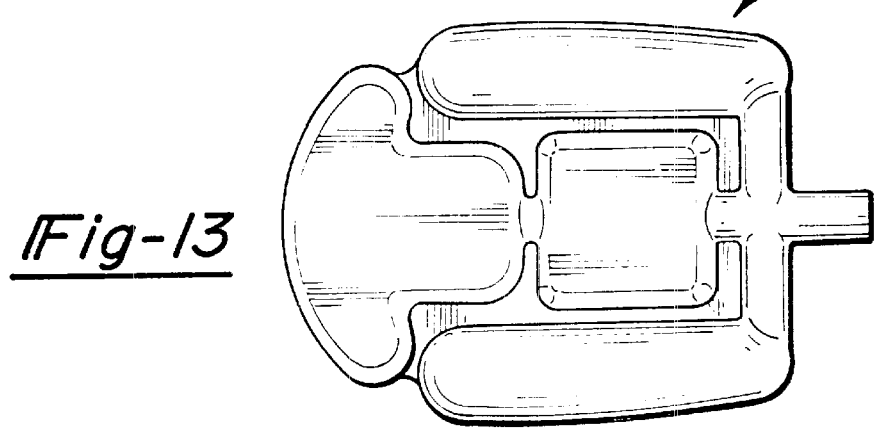
FIG. 13 is a top elevation view of the membrane illustrated in FIGS. 11 and 12.
Figure 14:
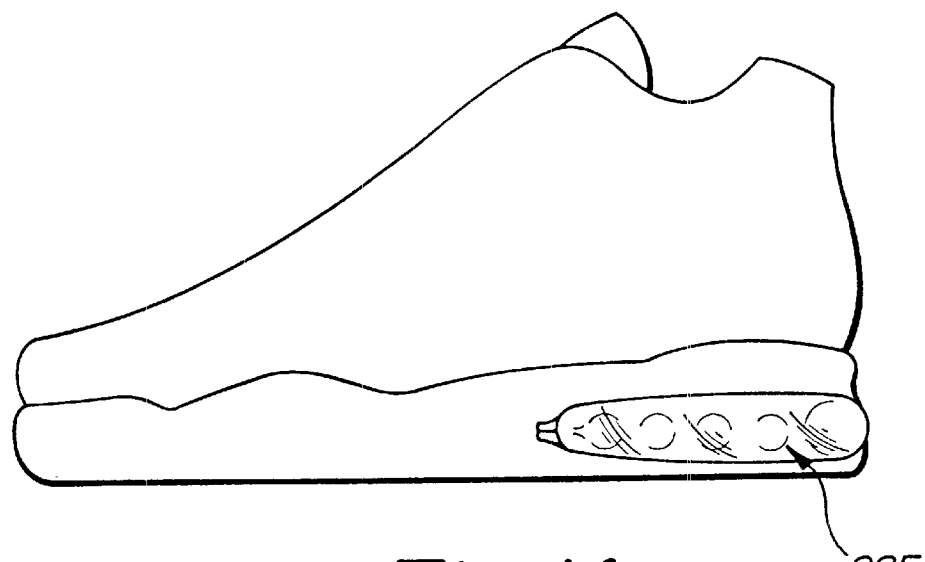
FIG. 14 is a side elevation view of an athletic shoe having another alternative membrane embodiment according to the present invention.
Figure 17:
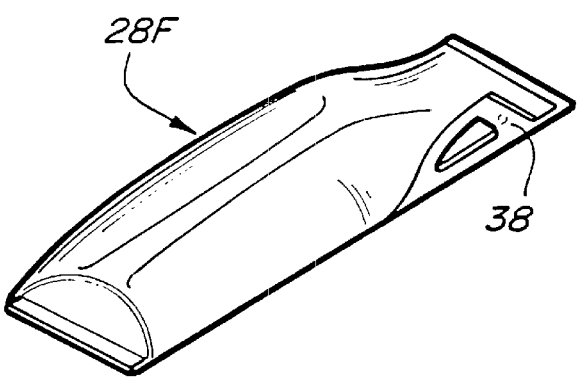
FIG. 17 is a perspective view of an alternative membrane embodiment according to the present invention.
Figure 18:
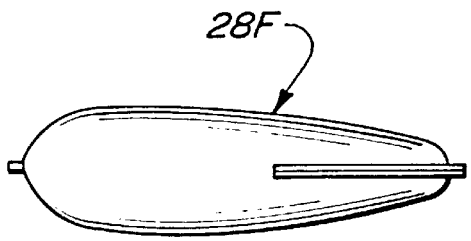
FIG. 18 is a side view of the membrane illustrated in FIG. 17.

In accordance with the present invention, the sole structure 14 includes one or more selectively permeable membranes 28 which are preferably disposed in the mid-sole 26 of the sole structure. By way of example, the membranes 28 of the present invention can be formed having various geometries such as the plurality of tubular members which are positioned in a spaced apart, parallel relationship to each other within the heel region 22 of the mid sole 26 as illustrated in FIGS. 1–5. The tubular members 28 are sealed inflatable membranes which contain an injected captive gas. More specifically, each of the membranes 28 are formed to include a barrier layer which permits diffusion of mobile gases therethrough but which resists or prevents diffusion of the captive gases. These predetermined diffusion properties of the membrane 28 are provided by an inner barrier layer 30 which is disposed in direct contiguous contact along the inner surface of a thermoplastic outer layer 32. These two membrane layers may be best seen in FIGS. 4 and 5. As previously noted, the membranes 28 of the present invention can be formed in a variety of configurations or shapes. For example, alternative membranes 28B could be formed in the shape of a heel ped as illustrated in FIGS. 8 and 9. Athletic shoes including the heel ped configurations set forth in FIGS. 8 and 9 have been used commercially and sold under the trademark Air Health Walker Plus™ by Nike, Inc. of Beaverton, Oreg. The heel ped configuration of FIGS. 8 and 9 is also shown in U.S. Design patent application Ser. No. 007,934, filed on Apr. 20, 1993. Similarly, heel peds having a geometry substantially similar to the membrane embodiment 28C illustrated in FIG. 10 have been used in athletic shoes sold under the trademark Air Structure II™ by Nike, Inc. The heel ped configuration of FIG. 10 is also shown in U.S. Design Pat. No. 343,504, issued on Jan. 25, 1994. By way of further example, an alternate membrane 28D illustrated with reference to FIGS. 11–13, is currently used in athletic shoes sold under the trademarks Air Max$^2$™ and Air Max$^2$CB™, also owned by Nike, Inc. are formable in accordance with the teachings of the present invention. This membrane configuration is also shown in U.S. Design Pat. No. 349,804, issued on Aug. 23, 1994, and U.S. Design Pat. No. 350,016 issued on Aug. 30, 1994. Yet, another alternative membrane 28E is illustrated with reference to FIGS. 14–16. The membrane 28E is currently utilized in athletic shoes sold under the trademark Air Max™ by Nike, Inc. This membrane configuration is also shown in U.S. Design patent application Ser. No. 897,966, filed on Jun. 12, 1992. Still another membrane configuration designated by reference numeral 28F is illustrated in FIGS. 17 and 18. As should be appreciated by this point, membrane configurations under the present invention (whether in the form of a tube, an elongated ped or other such configuration), may either be fully or partially encapsulated within the mid-sole or out-sole of an article of footwear.

While a number of the tubular members and heel peds having a geometry similar to those illustrated herein have been used commercially, such tubular members and heel peds as utilized in prior embodiments have typically been formed from single elastomeric materials. By way of example, the materials often used for the membranes (or envelopes as the term is used in such cited references) were typically selected from the group consisting of polyurethane elastomer materials, polyester elastomers, fluoro elastomers, polyvinyl chloride elastomers and the like wherein the resulting products were inflated with one or more super gases. Polyurethane elastomer materials were generally preferred because of their superior heat sealing properties, flexural fatigue strength, suitable modulus of elasticity, tensile and tear strength and abrasion resistance. However, art-disclosed polyurethane elastomer systems (i.e., employed alone or in combination with crystalline materials) tend to be much less effective as a barrier against the undesired diffusion of gases and super gases than the membranes of the present invention. Thus, it is a goal of the present invention to take advantage of the characteristics offered by polyurethane elastomers in general, while enhancing such characteristics by providing an improved barrier material which offers the advantages of diffusion pumping without resorting to the use of an adhesive or tie-layer, and which can be used in a wide variety of art-disclosed manufacturing processes.

Referring again to FIGS. 1–5, there is illustrated a first embodiment of a membrane 28 in accordance with teachings of the present invention. As shown, the membrane 28 has a composite structure including an outer layer 32 formed of a flexible resilient elastomeric material which preferably is resistant to expansion beyond a predetermined maximum volume for the membrane when subjected to gaseous pressure. The membrane 28 also includes an inner layer 30 formed of a barrier material which allows for controlled diffusion pumping or self-pressurization.

The outer layer 32 as previously noted, preferably is formed of a material or combination of materials which offer superior heat sealing properties, flexural fatigue strength, a suitable modulus of elasticity, tensile and tear strength and abrasion resistance. Among the available materials which offer the cited characteristics, it has been found that thermoplastic elastomers of the urethane variety, otherwise referred to herein as thermoplastic urethanes or simply TPU's, are highly preferred because of their excellent processibility. By the term "thermoplastic," as used herein, is meant that the material is capable of being softened by heating and hardened by cooling through a characteristic temperature range, and can therefore be shaped into various articles in the softened state via various techniques.

Among the numerous thermoplastic urethanes which are useful in forming the outer layer 32 are urethanes such as Pellethane™, (a trademarked product of the Dow Chemical Company of Midland, Mich.); Elastollan® (a registered trademark of the BASF Corporation); and ESTANE® (a registered trademark of the B.F. Goodrich Co.); all of which are either ester or ether based, have proven to be particularly useful. Still other thermoplastic urethanes based on polyesters, polyethers, polycaprolactone and polycarbonate macroglycols can be employed.

The inner layer 30 is the main barrier constituent primarily responsible for controlling gas permeation. The layer 30 may be made from one or more materials selected from the group consisting of co-polymers of ethylene and vinyl alcohol, polyvinylidene chloride, co-polymers of acrylonitrile and methyl acrylate, such as BAREXT™ which is a trademarked product of the British Petroleum Co., polyesters such as PET (Polyetheneterephelate), aliphatic and aromatic polyamides, liquid crystal polymers, and polyurethane engineering thermoplastics such as ISOPLAST, a trademark of Dow Chemical Co.

Of the above listed materials, an inner layer 30 formed from a co-polymer which includes ethylene and vinyl alcohol is highly preferred, with the most highly preferred being a co-polymer which consists essentially of ethylene and vinyl alcohol. One such type of highly preferred ethylene and vinyl alcohol-based co-polymer is a commercially available product known as SOARNOL™ which is available from the Nippon Gohsei Co., Ltd. (U.S.A.) of New York, N.Y. Another highly commercially available copolymer of ethylene and vinyl alcohol is EVAL® which is available from Eval Company of America, Lisle, Ill. Highly preferred commercially available copolymers of ethylene and vinyl alcohol will typically have an average ethylene content of between about 27 mol % to about 48 mol %. In general, higher ethylene contents result in stronger bonding between the respective layers of thermoplastic urethane and ethylene-vinyl alcohol copolymers.

Diffusion pumping is described in U.S. Pat. No. 4,340,626, previously incorporated herein by reference. As discussed in this patent, the gas used for inflating the membrane is different from ambient air surrounding the membrane, or, it is at least partially different from the ambient air surrounding the membrane. The inflating gas, referred to as "super gas," is selected from a group of gases having large molecules and low solubility coefficients, such gas exhibiting very low permeabilities and an inability to diffuse readily through the inner barrier layer. With the membrane surrounded by ambient air, it is noted that the pressure within the membrane rises comparatively rapidly after initial inflation. The rise in pressure may be due to the nitrogen, oxygen, and argon in the ambient air diffusing through the membrane to its interior, until the partial pressure of air contained within the membrane equals the atmospheric pressure outside the enclosure. Since the initial inflating gas can diffuse out through the enclosure only very slowly, while the ambient air is diffusing inwardly, the total pressure within the enclosure rises appreciably. Such total pressure is therefore the sum of the partial pressures of the air within the membrane and the pressure of the initial inflating gas within the membrane.

As further discussed in the '626 patent, the pressure rises above the initial inflation pressure during the first two to four months of the diffusion pumping action, and then slowly starts to decline. When the total pressure rise reaches its peak level, diffusion pumping has progressed to the point that the partial pressure of air within the membrane has reached its maximum. At this point, the membrane is now filled with a maximum amount of pressurizing medium (air) which cannot diffuse out of the device, because the pressure of the inside air is in equilibrium with the outside ambient air. Additionally, the super gas pressure is now less than it was at initial inflation, primarily because of the increase in volume of the device due to stretching of the elastomeric film. At the lower pressure, the normally very low diffusion rate of the super gas is reduced to even lower values. Both of these two factors, i.e. maximum air at equilibrium pressure and minimum diffusion of super gas, contribute to long term pressurization at essentially constant pressure.

After the pressure reaches a peak, the rate of decline is very low, the total pressure in the membrane remains above the initial pressure for about two years or longer thereafter, depending upon the particular inflation gas used, the material from which the membrane is made and the inflation pressure. As noted above, the decline in pressure may continue, but in view of the slow rate of diffusion of the gas from the membrane, the pressure in the membrane remains sufficiently high so as to enable the membrane to continue to be used effectively for several additional years. The membrane is, therefore, essentially permanently inflated.

For practical commercial utility with products of the present invention, it is important to have an appropriate and optimized balance between: (1) The minimum rate of activated diffusion on the one hand and (2) such physical properties as fatigue resistance, manufacturing processability, and heat-sealability on the other hand. Thus, it is preferable that the membranes not form a 100% barrier against diffusion allowing gases such as oxygen to diffuse therethrough while effectively preventing other gases, including nitrogen and the super gases, from diffusing through the membrane.

The fact that oxygen can diffuse through the membrane is not a problem and is, in fact, a desirable and unique benefit. For example, after inflating the membrane with nitrogen and/or super gas, the oxygen of the ambient environment can diffuse into the membrane through the mechanism of diffusion pumping as previously described. Thus, the partial pressure of oxygen is added to the partial pressures of nitrogen and/or super gas already contained within the membrane, with the result being that the total pressure of the product rises. The partial pressure of oxygen in the ambient atmosphere is about 2.5 psi (out of a total pressure at sea level of 14.7 psi). Thus, the reverse diffusion of oxygen gas into the membrane will cause a maximum rise in pressure of about 2.5 psi. Such a rise in pressure is useful in offsetting the substantial tensile relaxation of the membrane (with resultant increase in the internal volume of the enclosure) where all of the gas components of air diffuse into the membrane. Thus, one of the features of this invention is that the composite material of the membrane is a semi-permeable membrane to the gases in air other than nitrogen and is therefore not a complete gas barrier. The practical advantage is that the pressure loss due to volume increases from film relaxation are still offset by diffusion pumping of oxygen.

One of the practical advantages of controlling permeability and diffusion pumping relates to matching the tensile relaxation properties of the product with the changes in pressure due to retention of the captive gas and diffusion of the mobile gas. For example, in some products it is desirable to use a film either with a lower modulus of elasticity or thinner gage to provide a softer feel to the cushioning device. With lower gage or lower modulus, there is a greater tendency for the captive gas to diffuse through the barrier. To compensate for such loss, the device may be overinflated slightly. However, due to the thinness or low modulus of the film, the device tends to enlarge with the result being a product whose geometry is not quite that desired or which changes over time. Thus, by providing relatively thicker inner and outer layers 30 and 32, respectively, the modulus of elasticity is increased and also the flow of the captive gas is reduced and the product is able to maintain inflatant pressure with a comparatively small change in configuration without the need to substantially overinflate the product.

Due to the diffusion pumping capacity of the present invention, less expensive captive gases may be used. Additionally, light weight and less expensive materials may be used for the outermost layer 32 of the composite structure. The following table compares two super gases with less expensive captive gases that effectively act as super gases in accordance with the teachings of the present invention.

One cubic foot of gas or vapor at 25 psi and 70° F.

|  | LBS/FT³ OF VAPOR OR GAS AT 25 PSI AND 70° F. | DOLLARS PER LB. |
| --- | --- | --- |
| Hexafluoroethane (Super gas) | 1.00 | $7.19 |
| Sulfurhexafluoride (Super gas) | 1.05 | $5.90 |
| Nitrogen | 0.19 | $0.09 |
| Air | 0.20 | Zero |

Although not typically classified as super gases, air and nitrogen have been added to the table above because, from the standpoints of availability, cost and weight they are excellent inflating gas candidates in the practice of the present invention.

One of the important advantages of this invention is apparent from the membrane illustrated in FIGS. 8 and 9. As noted, there may be no substantial expansion of the membrane over the period of diffusion pumping, depending upon the geometry of the cushioning device. The overall dimensions of the membrane remain within about 3 to 5% of the original dimensions. Thus, the shape and geometry of the membrane remain fairly constant over the period of time from initial inflation, through diffusion pumping and through the useful life of the product.

As previously noted, the membranes as disclosed herein can be formed by various processing techniques including but not limited to blow molding, injection molding, vacuum molding and heat sealing or RF welding of tubing and sheet extruded film materials. Preferably, the membranes according to the teachings of the present invention are made from films formed by co-extruding the outer layer of thermoplastic urethane material and the inner layer of the ethylene-vinyl alcohol co-polymer together to effectively produce multi-layered film materials with the resulting membranes produced from this material. Subsequently, after forming the multi-layered film materials, the film materials are heat sealed or welded by RF welding to form the inflatable membranes which have the characteristics of both high flexibility and diffusion pumping capabilities.

Figure 6:
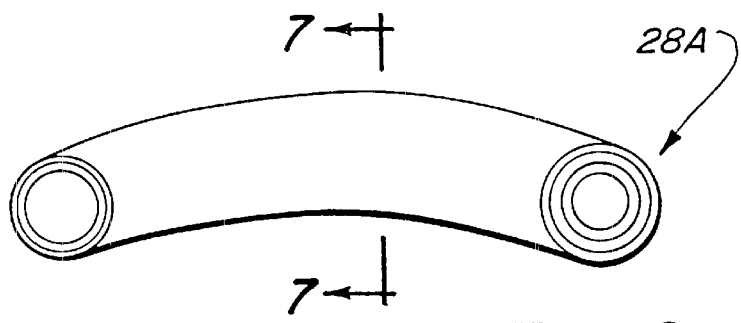
FIG. 6 is a fragmentary side perspective view of a second embodiment of a tubular-shaped, three-layer cushioning device in accordance with the present invention.
Figure 7:
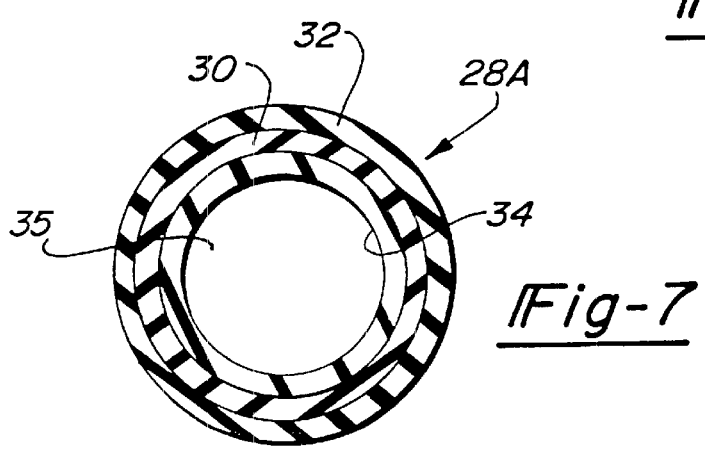
FIG. 7 is a sectional side view taken along line 6—6 of FIG. 6.

Referring now to FIGS. 6 and 7, an alternative membrane embodiment 28A in the form of an elongated tubular shaped multi-layered component is illustrated. The modified membrane 28A is essentially the same as the composite structure illustrated in FIGS. 1–5 except that a third layer 34 is provided contiguously along the inner surface of the barrier layer 30, such that the barrier layer 30 is sandwiched between the outer layer 32 and innermost layer 34. The innermost layer 34 is also preferably made from a thermoplastic urethane based material to add further protection against moisture for the barrier layer 30. In addition to the benefits of enforced protection against degradation of the barrier layer 30, layer 34 also tends to assist in providing for high quality welds which allows for the three-dimensional shapes of the bladders.

The air bladders shown in FIGS. 1–7 are preferably fabricated from multi-layered extruded tubes. Lengths of the coextruded tubing ranging from one foot to coils of up to 5 feet, are inflated to a desired initial inflation pressure ranging from 0 psi ambient to 100 psi, preferably in the range of 5 to 50 psi, with a captive gas, preferably nitrogen. Sections of the tubing are RF welded or heat sealed to the desired lengths to define an interior compartment 35. The individual bladders produced may then be separated by cutting through the welded areas between bladders. It should also be noted that the air bladders can be fabricated with so-called lay flat extruded tubing with the internal geometry being welded into the tube.

As the thermoplastic urethane and main barrier material (i.e. EVOH) advance to the exit end of the extruder through individual flow channels, once they near the die-lip exit, the melt streams are combined and arranged to float together in layers typically moving in laminar flow as they enter the die body. Ideally, the materials are combined at a temperature of between about 300° F. to about 450° F. to obtain optimal wetting for maximum adhesion between the contiguous portions of the layers 30, 32 and 34 respectively.

As will be discussed in more detail in connection with FIGS. 6 and 7, according to FIGS. 6 and 7, the membrane 28A comprises three layers including a first layer of thermoplastic urethane 32, a second intermediate layer of a barrier material 30, and a third layer 34 of a thermoplastic urethane arranged in a "sandwich" configuration.

In a highly preferred embodiment, the two thermoplastic urethane layers and the layer of ethylene-vinyl alcohol copolymer are coextruded employing temperatures which are sufficiently elevated to cause a reactive contact to form substantially throughout thus eliminating the need for an intermediate adhesive or bonding layer.

While not intending to be bound by current theory and knowledge, it is believed that thermoplastic urethane and ethylene vinyl alcohol copolymer prepolymerized sheets, when brought into reactive contact at temperatures in the range of about 300° F. to about 450° F. (e.g., coextruded for example) at a pressure of at least about 200 psi, allow sufficient hydrogen bonding to take place such that an integral laminate is provided.

Preferably, the thermoplastic polyurethane and ethylene vinyl alcohol are not modified in an effort to create cross-linking or conventional covalent bonding between the two layers; nor are any tie-layers or adhesive employed. The preferred compositions and methods of the present invention rely exclusively on the inherent properties of the thermoplastic urethane and copolymer of ethylene and vinyl alcohol when brought into reactive contact according to the methods of the present invention.

The apparent chemical reaction which forms a surface bond between the various alternating layers including thermoplastic urethane and the copolymer of ethylene and vinyl alcohol which occur across substantially the entire intended contact surface area of the membrane 28A can be summarized as follows:

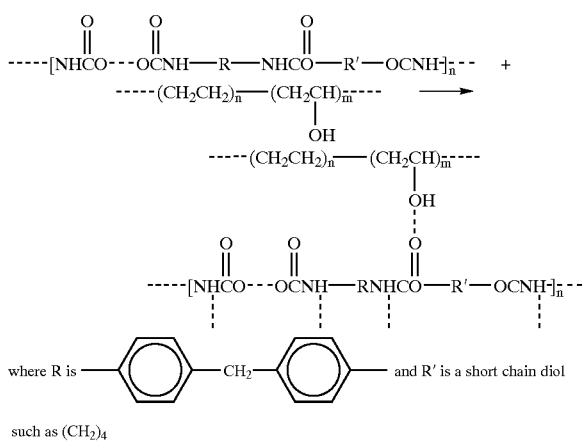

In addition to the apparent hydrogen bonding which occurs, other factors such as orientation forces and induction forces, otherwise known as van der Waals forces, which result from London forces which exist between any two molecules and dipole-dipole forces which are present between polar molecules, also contribute to the bond strength between contiguous layers of thermoplastic material and the main barrier material.

Tests were conducted on materials used to form the laminated membranes 10 of the present invention and on samples of the membranes to characterize the reaction. Initially, a sample of a commercially available form of thermoplastic urethane (namely Pellethane™) was placed in a solution of ethylene diamine to determine whether any free isocyanate groups were present. No precipitation occurred; thus, no urea was formed. It was accordingly deduced that no available isocyanate groups were present to potentially bond with the hydroxyl groups offered by the vinyl alcohol constituent of the copolymer of ethylene and vinyl alcohol.

Thus, no significant conventional isocyanate/polyol reaction is taking place as described in U.S. Pat. No. 5,036,110, nor is it necessary for the reactive contact of the instant invention.

Thereafter, samples in the form of thin films were prepared for use in characterizing the possible surface reaction between oxygen molecules contained on the thermoplastic urethane and hydroxyl groups offered by the vinyl alcohol constituent of the copolymer of ethylene and vinyl alcohol. Relatively thin films were prepared of Elastollane® C-90A-13(000) polyester based thermoplastic urethane, Pellethane™ 2355-87AE polyester based thermoplastic urethane and SOARNOL™ ethylene vinyl alcohol copolymer. Additionally, a thin film was formed from a three layer laminate including a first layer of Pellethane™ 2355-80AE, a second layer of EVAL™ and a third layer of Pellethane™ 2355-80AE. According to the Fourier Transform Infrared Radiation Spectrum shown in FIGS. 20 through 23, substantial hydrogen bonding was detected in each film at approximately the 3400 wave number, $cm^{-1}$. Thus, the strong bond observed in the membranes of the present invention (without cross-linking or the use of a tie-layer or adhesive) appears to be substantially generated by hydrogen bonding which is observed to occur over substantial lengths of the membranes of the present invention. Accordingly, membranes of the present invention employing alternating layers of thermoplastic urethane and copolymers of ethylene vinyl alcohol will resist delamination (except when disposed in highly polar solvents) without requiring adhesive or tie-layers.

The hydrogen bonding between layers of thermoplastic urethane and the ethylene-vinyl alcohol copolymer of the present invention is in contrast to prior art embodiments which typically have used adhesive tie-layers such as Bynel, for example, to improve and maintain the bonding between the various layers of thermoplastic urethane and ethylene vinyl alcohol. The arts' failure to recognize the existence and/or potential of such bonding is further illustrated in U.S. Pat. No. 5,036,110. The patent discloses a pre-mixing of the a copolymer of ethylene and vinyl alcohol with thermoplastic polyurethane in order to provide a barrier layer which is sandwiched between layers of thermoplastic polyurethane. This is different than unmixed layers of thermoplastic urethane and copolymer of ethylene and vinyl alcohol. The patentee of U.S. Pat. No. 5,036,110 further suggests that the premixed layer of thermoplastic urethane and ethylene and vinyl alcohol copolymer must be further modified in order to be securely bound to the two TPU layers.

In this regard, significant bonding occurs as the result of available hydrogen molecules being donated by the vinyl alcohol group of the ethylene-vinyl alcohol co-polymer along the length of the laminated membrane and hydroxyl and urethane, or simply the available polar groups.

It should also be noted that the composition of the thermoplastic urethane also has an effect on the bonding between the barrier layer 30 (i.e. ethylene-vinyl alcohol) and the outer layer 32 and inner layer 34 (i.e. thermoplastic urethane). Additionally, fillers such as non-polar polymeric materials and inorganic fillers or extenders such as talc, silica, mica, etc., tend to negatively effect the bonding capacity of the thermoplastic urethane and ethylene vinyl alcohol materials.

In general, the thermoplastic urethane (i.e. polyurethanes) of the present invention have alternating block copolymers having (20–50%) of a hard segment, linked by soft segments (50–80%) of elastomeric materials (polyester or polyethers)

which are rubber-like at normal service temperatures. The hard and soft segments may be ordered or random along the polymer chain. The composition of the hard blocks is typically diphenyl urethane diisocyanate, commonly referred to as MDI, and 1–4 butane diol. When heated, the hard and soft TPU block copolymer segments melt and the material becomes fluid, and some urethane bonds may dissociate. When cooled, the segments reharden and link the soft segments to give a solid-state structure similar to thermoplastic rubber. Also, since the TPU elastomers are relatively polar, they are quite readily heat-sealable, especially with a R-F dielectric heat-sealing.

Figure 15:
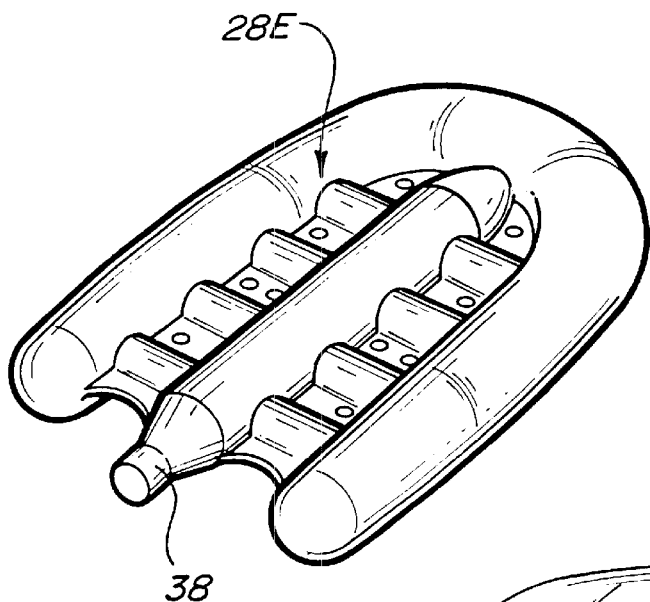
FIG. 15 is a perspective view of the membrane illustrated in FIG. 14.
Figure 16:
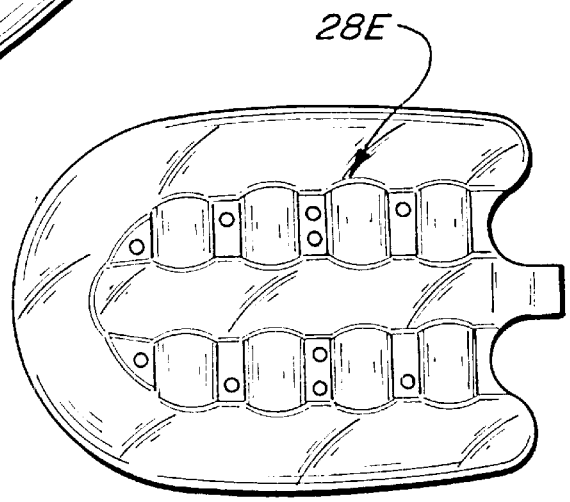
FIG. 16 is a top view of the membrane illustrated in FIGS. 14 and 15.

In FIGS. 12–16, bladders fabricated by blow molding are shown. Parisons of two layer, or preferably three layer film are coextruded. The parisons are then blown and formed using conventional blow molding techniques. The resulting bladders, shown best in FIGS. 12 and 15 are then inflated with the desired captive gas to the preferred initial inflation pressure and then the inflation port (e.g. inflation port 38) is sealed by RF welding.

Another preferred bladder fabrication method is shown in FIGS. 8–10. Sheets or films of coextruded two layer, or preferably three layer film are first formed. The thickness range of the coextruded sheets or films is between 0.001 inches to 0.100 inches, preferably 0.010 inches to 0.050 inches. Two sheets of the multi-layer film are placed on top of each other and welded together along selected points using conventional heat sealing techniques or RF welding techniques to form an interior compartment. The interior compartment of the uninflated bladder is then inflated through the formed inflation port 130 to the desired initial inflation pressure which ranges from 0 psi ambient to 100 psi, preferably 5 to 50 psi. The preferred captive gas is nitrogen.

Another preferred bladder as shown in FIGS. 17 and 18, is fabricated by forming coextruded two and three layer tubing. The thickness range of the co-extruded tubing wall, i.e. a cross-section through all layers, is between 0.001 inches to about 0.100 inches and preferably between 0.010 inches to 0.050 inches. The tubing is collapsed to a lay flat configuration and the opposite walls are welded together at selected points and at each end using conventional heat sealing techniques or RF welding. The bladder is then inflated through the formed inflation port 38 to the desired inflation pressure which ranges from 0 psi ambient to 100 psi, and preferably from 5 to 50 psi, with the preferred captive gas being nitrogen. The various products described in the figures presented are designed to be used as mid-soles for articles of footwear, and particularly in athletic shoes. In such applications, the inflatable membranes may be used in any one of several different embodiments: (1) completely encapsulated in a suitable mid-sole foam; (2) encapsulated only on the top portion of the unit to fill-in and smooth-out the uneven surfaces for added comfort under the foot; (3) encapsulated on the bottom portion to assist attachment of the out-sole; (4) encapsulated on the top and bottom portions but exposing the perimeter sides for cosmetic and marketing reasons; (5) encapsulated on the top and bottom portions but exposing only selected portions of the sides of the unit; (6) encapsulated on the top portion by a molded "Footbed"; and (7) used with no encapsulation foam whatsoever.

Figure 19:
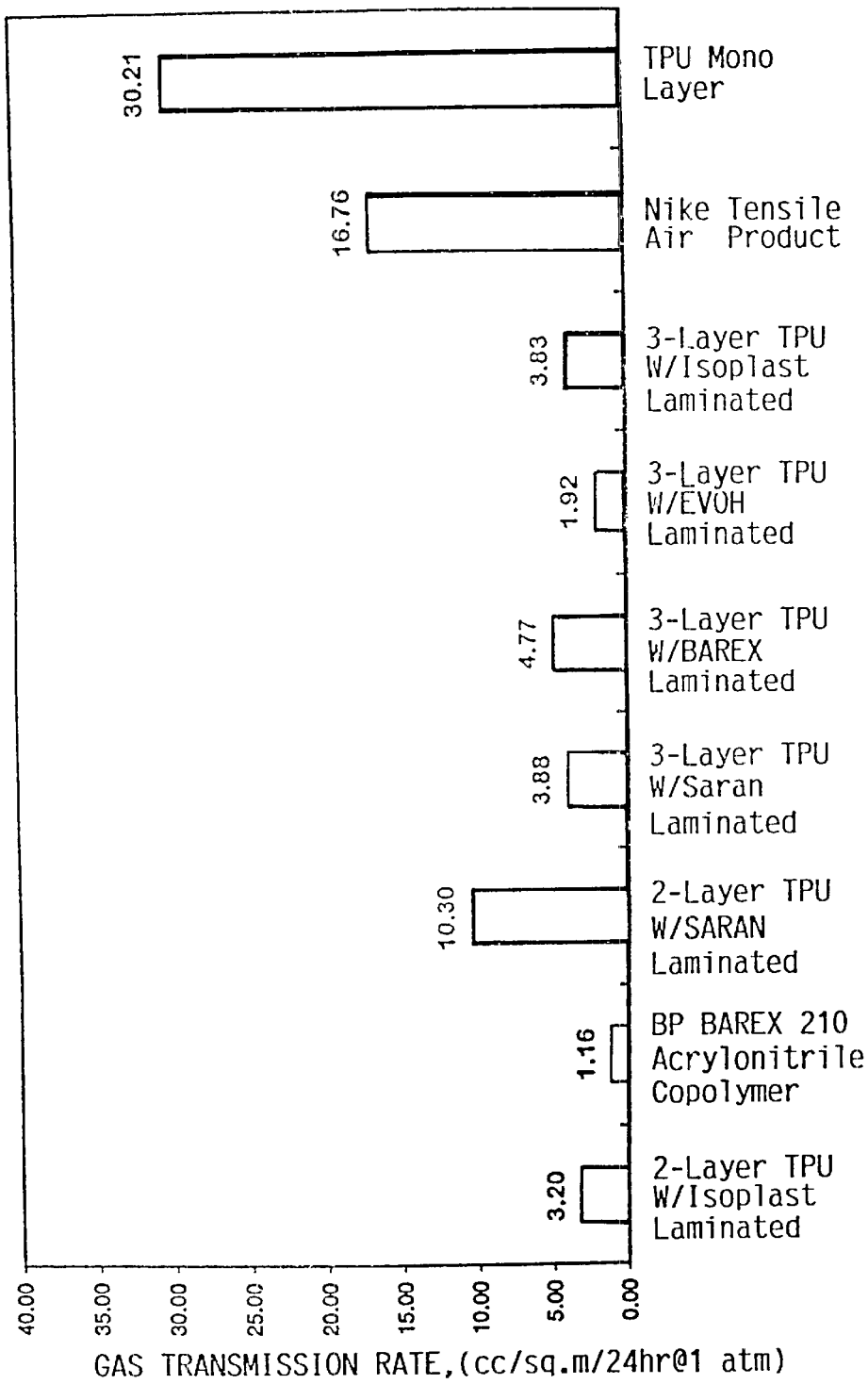
FIG. 19 is a schematic view of a graph representing gas transmission rates for various materials.
Figure 20:
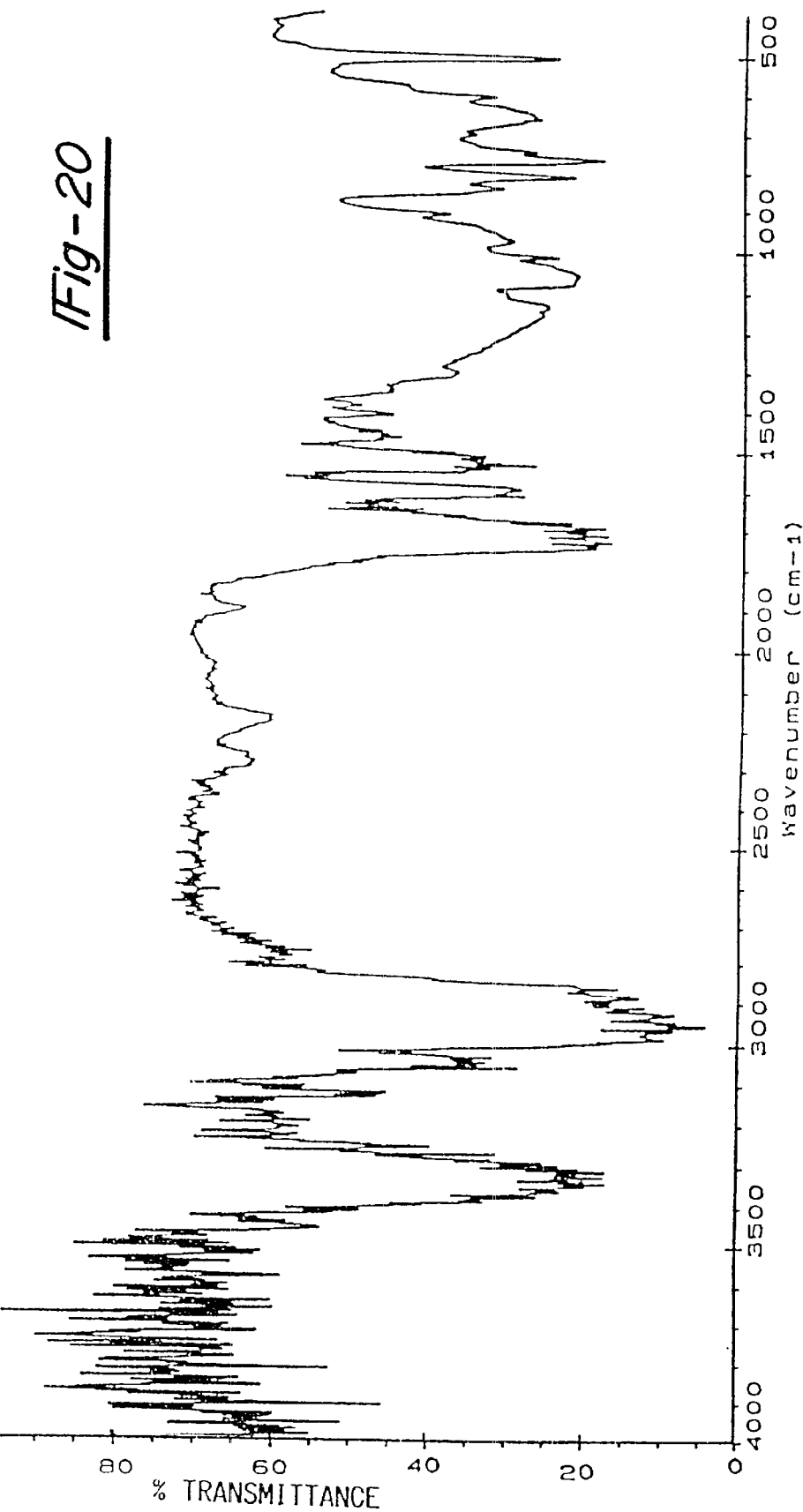
FIG. 20 is a schematic view of a Fourier Transform Infrared Radiation (FTIR) spectrum of a first sample material.
Figure 21:
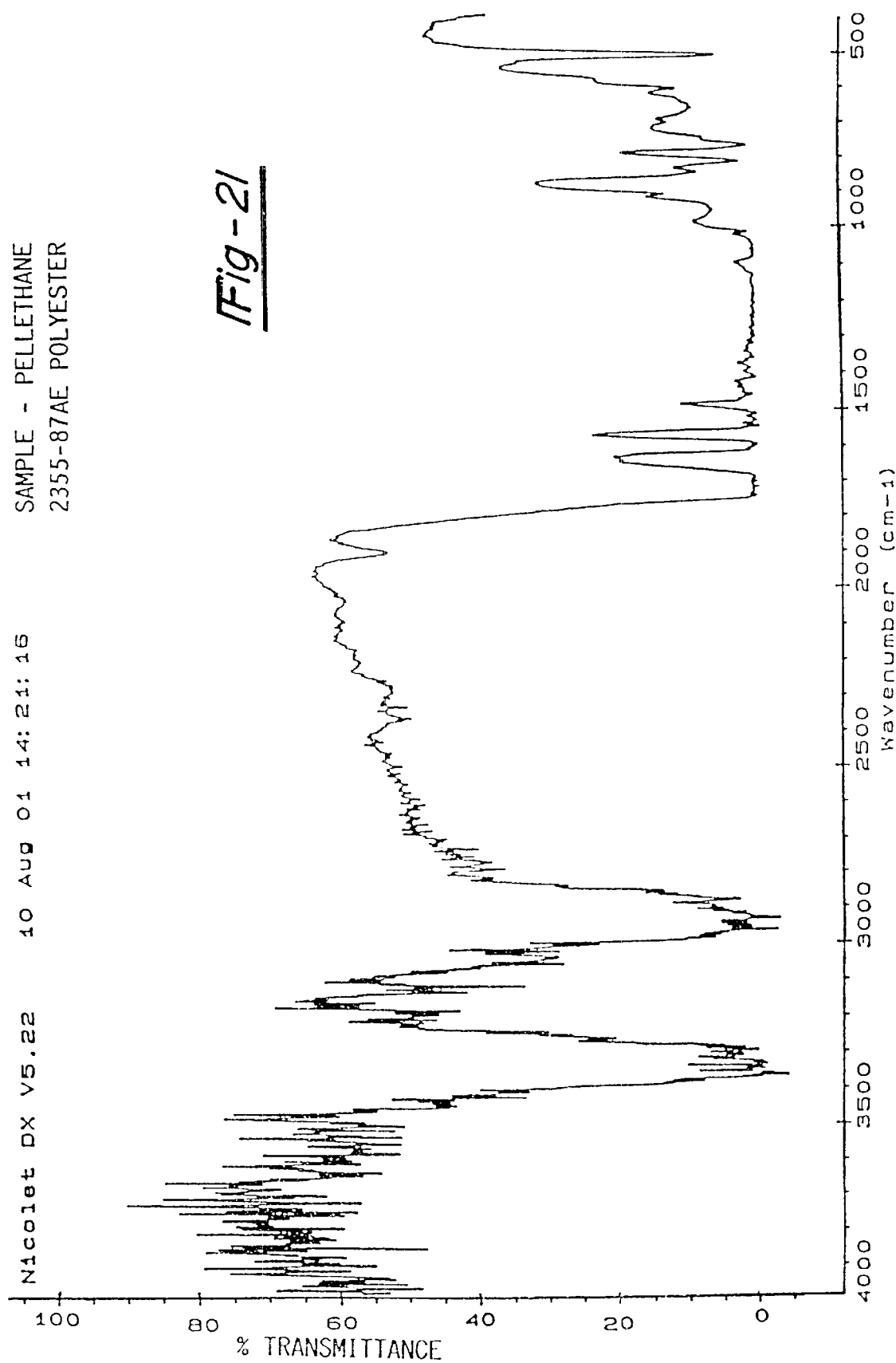
FIG. 21 is a schematic view of a Fourier Transform Infrared Radiation (FTIR) spectrum of a second sample material.
Figure 22:
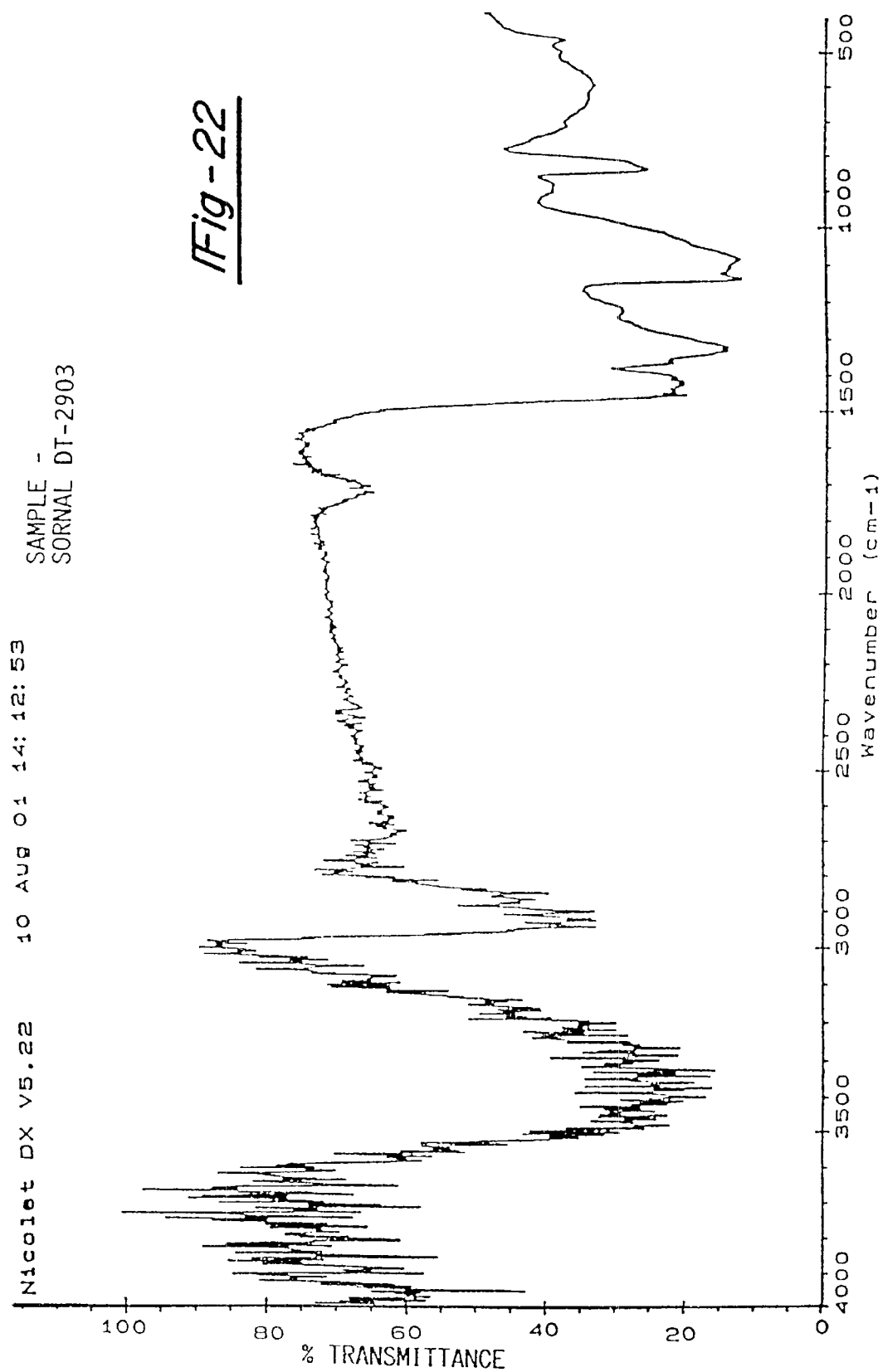
FIG. 22 is a schematic view of a Fourier Transform Infrared Radiation (FTIR) spectrum of a third sample material.
Figure 23:
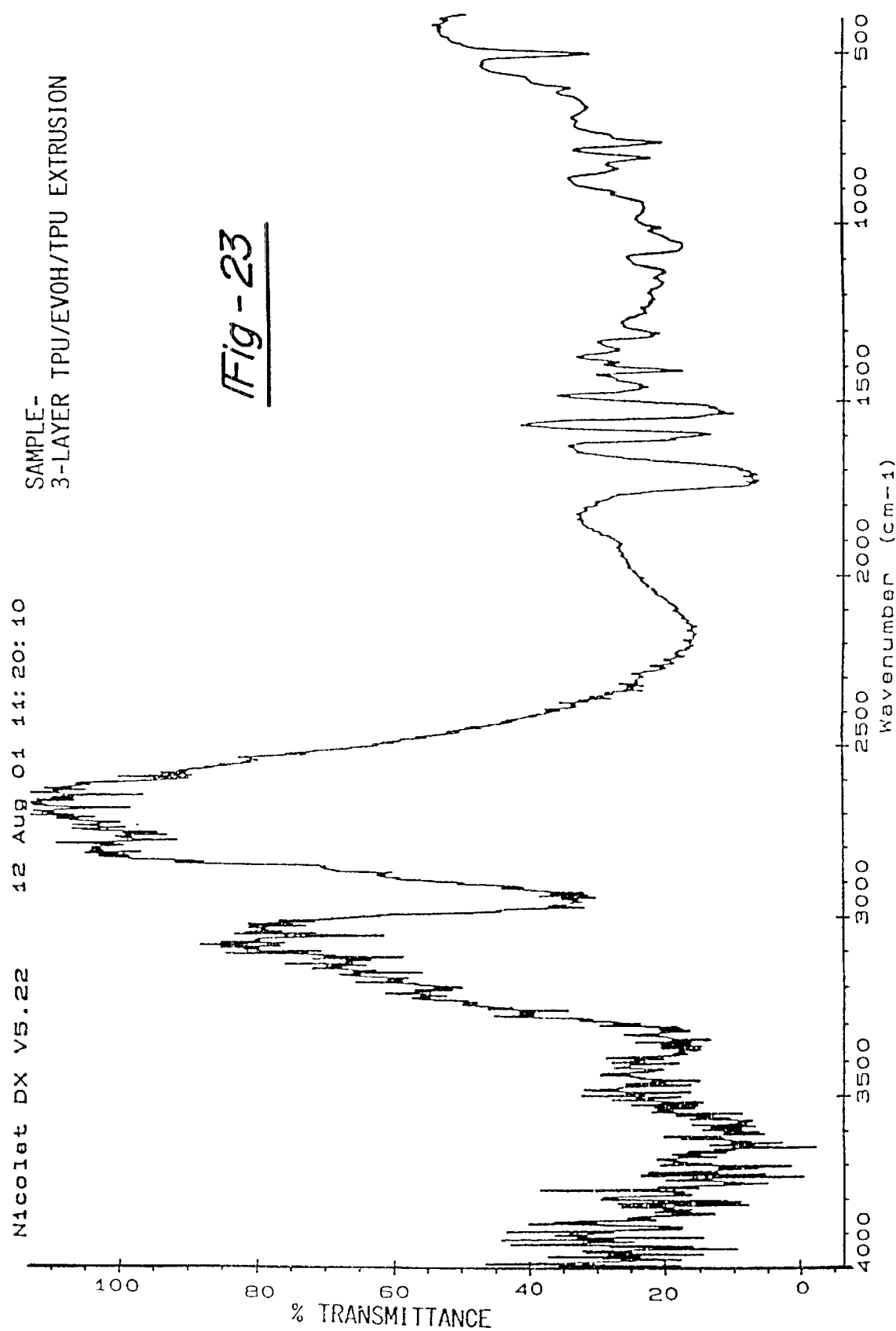
FIG. 23 is a schematic view of a Fourier Transform Infrared Radiation (FTIR) spectrum of a fourth sample material.

By way of further example, gas transmission rates for various materials most of which are included with the scope of the present invention are illustrated in FIG. 19. As can be seen from a review of FIG. 19, the laminated products offer the advantages of relative low gas transmission rates in addition to the flexible characteristics offered by the thermoplastic urethane constituent.

While the above detailed description describes the preferred embodiment of the present invention, it should be understood that the present invention is susceptible to modification, variation and alteration without deviating from the scope and fair meaning of the subjoined claims.

what is claimed is:

1. A permanently sealed and permanently inflated membrane, comprising
   a first layer including thermoplastic polyurethane; and
   a second layer including a copolymer of ethylene and vinyl alcohol;
   wherein reactive contact consisting essentially of hydrogen bonding occurs along substantially the entire surface area of contact between the thermoplastic polyurethane and copolymer of ethylene and vinyl alcohol layers
   and further wherein said membrane controls the rate of outward diffusion of an internal gas of said membrane and allows diffusion pumping of an external mobile gas into the membrane.

2. The membrane according to claim 1 further comprising a third layer including a thermoplastic polyurethane.

3. The membrane according to claim 1 wherein said thermoplastic polyurethane is selected from the group consisting of polyester, polyether, polycaprolactone, polyoxypropylene and polycarbonate macroglycol based materials and mixtures thereof.

4. The membrane according to claim 1 wherein said copolymer of ethylene and vinyl alcohol is selected from the group consisting of copolymers including an ethylene content of between about 27 mol. % to about 48 mol. %.

5. The membrane according to claim 2 wherein said third layer of thermoplastic polyurethane is selected from the group consisting of polyester, polyether, polycaprolactone, polyoxypropylene and polycarbonate macroglycol based materials and mixtures thereof.

6. The membrane according to claim 1 wherein said first layer including thermoplastic polyurethane has an average thickness of between about 0.0010 inches to about 0.100 inches.

7. The membrane according to claim 1 wherein said second layer including a copolymer of ethylene and vinyl alcohol has an average thickness of between about 0.0010 inches to about 0.010 inches.

8. The membrane according to claim 1 wherein said first layer including thermoplastic polyurethane has an average thickness of between about 0.005 inches to about 0.050 inches and said second layer including a copolymer of ethylene and vinyl alcohol has an average thickness of between about 0.0025 inches to about 0.0050 inches.

9. A gas-filled membrane according to claim 1, wherein said gas filling said membrane comprises a member selected from the group consisting of nitrogen, super gases, and combinations thereof.

10. A gas-filled membrane according to claim 1, wherein said external mobile gas comprises a member selected from the group consisting of argon, oxygen, carbon dioxide, air, and combinations thereof.

11. A gas-filled membrane according to claim 1, wherein said gas filling said membrane comprises nitrogen and further wherein said external mobile gas comprises oxygen.

12. A gas-filled membrane according to claim 1, wherein said membrane retains at least 80% of its initial gas pressure after two years.

13. A bladder, comprising a membrane according to claim 1 having been sealed to define an interior compartment, said interior compartment being gas-filled.

14. A permanently sealed and permanently inflated membrane, comprising
- a first layer including a thermoplastic polyurethane;
- a second layer including a copolymer of ethylene and vinyl alcohol; and
- a third layer including a thermoplastic polyurethane;
- wherein reactive contact consisting essentially of hydrogen bonding occurs along substantially the entire surface area of contact between the copolymer of ethylene and vinyl alcohol and the thermoplastic polyurethane layers;
- and further wherein said membrane controls the rate of outward diffusion of an internal gas of said membrane and allows diffusion pumping of an external mobile gas into the membrane.

15. The membrane according to claim 14 wherein at least one of said layers including thermoplastic polyurethane is selected from the group consisting of polyester, polyether, polycaprolactone, polyoxypropylene and polycarbonate macroglycol based materials and mixtures thereof.

16. The membrane according to claim 14 wherein said copolymer of ethylene and vinyl alcohol is selected from the group consisting of copolymers including an ethylene content of between about 27 mol. % to about 48 mol. %.

17. The membrane according to claim 15 wherein one of said layers including thermoplastic polyurethane has an average thickness of between about 0.001 inches to about 0.100 inches.

18. The membrane according to claim 15 wherein said second layer including a copolymer of ethylene and vinyl alcohol has an average thickness of between about 0.0010 inches to about 0.010 inches.

19. The membrane according to claim 15 wherein said first layer including a thermoplastic polyurethane has an average thickness of between about 0.005 inches to about 0.050 inches, said second intermediate layer including a copolymer of ethylene and vinyl alcohol has an average Thickness of between 0.0025 inches to about 0.0050 inches and said third layer including a thermoplastic urethane has an average thickness of between about 0.005 inches to about 0.050 inches.

20. A method for producing a permanently sealed and permanently inflated bladder, comprising the steps of:
- simultaneously extruding a first layer including thermoplastic polyurethane and a second layer including a copolymer of ethylene and vinyl alcohol together to form a membrane wherein reactive contact consisting essentially of hydrogen bonding occurs along substantially the entire surface area of contact between the first and second layers
- forming the membrane into a bladder having an interior compartment and a port,
- filling the interior compartment through the port with a gas, and
- sealing the port; and further wherein said bladder controls the rate of outward diffusion of an internal gas of said membrane and allows diffusion pumping of an external mobile gas into the membrane.

21. The method according to claim 22 wherein said copolymer of ethylene and vinyl alcohol is selected from the group consisting of copolymers including an ethylene content of between about 27 mol. % to about 48 mol. %.

22. The method according to claim 20 wherein the extrusion is carried out at a temperature of between about 300° F. to about 450° F.

23. A method for producing a permanently sealed and permanently inflated bladder, comprising the steps of:
- simultaneously extruding a first layer including thermoplastic polyurethane, a second intermediate layer including a copolymer of ethylene and vinyl alcohol, and a third layer including a thermoplastic polyurethane wherein reactive contact consisting essentially of hydrogen bonding occurs along substantially the entire surface area of contact between at least one layer including the thermoplastic polyurethane and said layer including the copolymer of ethylene and vinyl alcohol,
- forming the membrane into a bladder having an interior compartment and a port,
- filling the interior compartment through the port with a gas, and
- sealing the port; and further wherein said bladder controls the rate of outward diffusion of an internal gas of said membrane and allows diffusion pumping of an external mobile gas into the membrane.

24. The method according to claim 23 wherein said copolymer of ethylene and vinyl alcohol is selected from the group consisting of copolymers including an ethylene content of between about 27 mol. % to about 48 mol. %.

25. The method according to claim 23 wherein the extrusion step is carried out at a temperature of between about 300° F. to about 450° F.

26. A bladder, formed from a tubular membrane that is permanently sealed and inflated to an initial pressure of up to about 100 psi,
- wherein said tubular membrane has a first layer including thermoplastic polyurethane and a second layer including a copolymer of ethylene and vinyl alcohol;
- and further wherein reactive contact occurs along substantially the entire surface area of contact between the thermoplastic polyurethane and copolymer of ethylene and vinyl alcohol layers, said reactive contact consisting essentially of hydrogen bonding; and wherein said bladder controls the rate of outward diffusion of an internal gas of said membrane external mobile gas into the membrane.

* * * * *

UNITED STATES PATENT AND TRADEMARK OFFICE
CERTIFICATE OF CORRECTION

PATENT NO.    : 6,521,305 B1
DATED         : February 18, 2003
INVENTOR(S)   : Paul H. Mitchell et al.

It is certified that error appears in the above-identified patent and that said Letters Patent is hereby corrected as shown below:

Column 7,
Line 22, "15." should be -- 15; --.

Column 9,
Line 45, "BAREXT" should be -- BAREX --.

Column 14,
Line 10, "Elastollane" should read -- Elastollan --.
Line 40, before "copolymer" delete "a".

Column 15,
Line 12, "R-F" should be -- RF --.

Column 17,
Line 39, "Thickness" should be -- thickness --.
Line 40, "urethane" should be -- polyurethane --.
Line 51, after "layers" insert -- , --.

Column 18,
Line 5, "22" should be -- 20 --.
Line 53, after "membrane" insert -- and allows diffusion pumping of an --.

Signed and Sealed this

Twenty-second Day of June, 2004

JON W. DUDAS
*Acting Director of the United States Patent and Trademark Office*